(12) United States Patent
Thomas (10) Patent No.: US 9,500,128 B2
(45) Date of Patent: Nov. 22, 2016

(54) HEAT-EXCHANGE ARCHITECTURE BUILT INTO THE EXHAUST OF A TURBINE ENGINE

(75) Inventor: Rainer Thomas, Idron (FR)

(73) Assignee: TURBOMECA, Bordes (FR)

( * ) Notice: Subject to any disclaimer, the term of this patent is extended or adjusted under 35 U.S.C. 154(b) by 816 days.

(21) Appl. No.: 13/704,261

(22) PCT Filed: Jul. 5, 2011

(86) PCT No.: PCT/FR2011/051584
§ 371 (c)(1),
(2), (4) Date: Dec. 14, 2012

(87) PCT Pub. No.: WO2012/004515
PCT Pub. Date: Jan. 12, 2012

(65) Prior Publication Data
US 2013/0086906 A1    Apr. 11, 2013

(30) Foreign Application Priority Data
Jul. 6, 2010   (FR) ...................... 10 55452

(51) Int. Cl.
*F02C 7/08*    (2006.01)
*F02C 7/00*    (2006.01)
*F01D 25/30*   (2006.01)

(52) U.S. Cl.
CPC ............ *F02C 7/00* (2013.01); *F01D 25/30* (2013.01); *F02C 7/08* (2013.01); *Y02T 50/671* (2013.01)

(58) Field of Classification Search
CPC ............ F02C 7/08; F02C 7/10; F01D 25/30
See application file for complete search history.

(56) References Cited

U.S. PATENT DOCUMENTS 3,000,176 A * 9/1961 Kuhrt .................. F02C 7/08
                                                  60/244
3,241,310 A * 3/1966 Hoadley ............... F02C 7/08
                                                  60/267

(Continued)

FOREIGN PATENT DOCUMENTS

DE    20 2008 008 567    11/2008
EP       1 589 204        10/2005

(Continued)

OTHER PUBLICATIONS

International Search Report Issued Feb. 3, 2012 in PCT/FR11/051584 Filed Jul. 5, 2011.

*Primary Examiner* — Arun Goyal
(74) *Attorney, Agent, or Firm* — Oblon, McClelland, Maier & Neustadt, L.L.P.

(57) ABSTRACT

A heat-exchange architecture for exhaust of a turbine engine, including heat-exchange elements partially obstructing a hot exhaust gases stream. In an architecture built into an exhaust line for gas streams of a turbine engine, the turbine engine is a turboshaft engine including a gas generator and a free turbine supplying power to a shaft via a through-shaft and an upstream reduction gear. An annular plate-shaped exchanger is installed in the axisymmetric portion of the ejector. The exchanger includes inlet and outlet channels, connected to the inlet and outlet of a central channel wound into a helix shape or sine curve in the annular plate. The channels are connected at the other ends to mechanical or electromechanical mechanisms for recovering and recycling energy. The energy is recovered via a cold fluid heated in the central channel by transfer of heat from residual gases.

13 Claims, 7 Drawing Sheets

(56) References Cited

U.S. PATENT DOCUMENTS

| | | | |
|---|---|---|---|
| 3,302,397 A | 2/1967 | Davidovic | |
| 4,147,024 A | 4/1979 | Moellmann | |
| 5,632,142 A * | 5/1997 | Surette | F01D 25/30 60/39.41 |
| 6,092,361 A * | 7/2000 | Romani | F28D 7/005 60/39.511 |
| 6,438,936 B1 * | 8/2002 | Ryan | F02C 7/10 165/166 |
| 6,647,732 B2 * | 11/2003 | Kuo | F01D 5/03 415/91 |
| 7,254,937 B2 * | 8/2007 | Hull | F02C 7/08 60/266 |
| 2004/0025509 A1 * | 2/2004 | Lawlor | F01D 15/10 60/772 |
| 2005/0235626 A1 | 10/2005 | Hull et al. | |
| 2005/0235627 A1 | 10/2005 | Vandermolen | |
| 2009/0277154 A1 | 11/2009 | Wood | |
| 2011/0146226 A1 * | 6/2011 | Wood | F02C 7/10 60/39.511 |

FOREIGN PATENT DOCUMENTS

| | | |
|---|---|---|
| EP | 1 930 543 | 6/2008 |
| FR | 1 518 230 | 3/1968 |
| GB | 629 832 | 9/1949 |
| UA | 24 041 | 6/2007 |
| WO | 2012 004516 | 1/2012 |

* cited by examiner

HEAT-EXCHANGE ARCHITECTURE BUILT INTO THE EXHAUST OF A TURBINE ENGINE

TECHNICAL FIELD

The invention relates to a heat-exchange architecture that is designed so as to enable an optimized installation into an exhaust assembly of a turbine engine.

A turbine engine is defined herein as an aeronautical gas engine capable of supplying power at a shaft. Turboshaft engines (helicopter engines, auxiliary power units or APUs) and turboprops (aircraft, drones) generally belong to this category.

Typically, the basic architecture of an aircraft turbine engine comprises as essential component units with rotational symmetry successively ordered from upstream to downstream along the same primary line: an air inlet, at least one air compressor, a gas combustion chamber, at least one high-pressure turbine for driving the compressor by means of a high-pressure shaft, at least one free turbine converting the energy stemming from combustion into available mechanical energy—and meshed with a power shaft in order to drive loads—and an assembly for exhausting the residual gases.

The morphology of the structural units constituting the exhaust assembly depends on the architecture of the turbine engine, which in turn depends on the location of the power take-off. The following architectures are to be found:

- turbine engines equipped with a through-going power shaft and front power take-off,
- turbine engines equipped with rear power shaft and front power take-off via an outside shaft,
- turbine engines equipped with rear power shaft with rear power take-off.

It is advantageous to build, into the structural units for exhausting the hot gases, heat exchange means so as to recover the residual energy and re-input it into the turbine engine in order to increase the power available at the shaft and thus the efficiency of the engine.

STATE OF THE ART

Heat exchangers exist for land-based gas turbines which have an architecture of the same type as the aeronautical turbine engines but no mass constraint. Furthermore, for these turbines, the life time of the parts generally prevails over the efficiency of the component parts.

These heat exchangers for land-based turbines are generally of the obstructive-type and are positioned into the exhaust so that they are fluxed by all of the exhaust gases. Such heat exchangers make it possible to maximize the recovery of energy at the outlet of the hot gas stream. But this recovery is penalized by an important increase in weight combined with an important pressure drop at exhaust. So these heat exchangers cannot be used with aeronautical turbine engines.

DISCLOSURE OF THE INVENTION

The aim of the invention is to provide a heat-exchange architecture for the exhaust of a turbine engine which is suitable for optimizing an overall compromise between performance, weight, production cost and operating costs (consumption, maintenance) of such an architecture.

For this purpose, the invention provides a heat-exchange architecture that partially obstruct the hot stream of the exhaust gases, without strong disturbance, with the aim of an optimized partial recovery of the thermal energy of the exhaust gases. This approach makes it possible to adjust the parameters of the exchange architecture (location, porosity, supply, pressure, aerodynamic characteristics, etc.) according to the architecture of the involved turbine engine in order to optimize the overall compromise.

More precisely, the object of the present invention is an architecture with heat exchanger built into an exhaust line for the stream of the hot gases of a turbine engine, in which the heat-exchange elements installed in one of the units constituting the exhaust line have a structure which is capable of channeling the stream of the hot gases. A partial obstruction of the stream of the gases, in an environment that globally diffuses these gases, is achieved while a part of the stream flows across these heat-exchange elements, so as to recover some residual thermal energy from the exhaust gases in order to increase the power available at the shaft of the turbine engine, without substantially disturbing the stream of the gases.

According to particular embodiments:

- The heat-exchange elements have a structure the section of which develops continuously, so that the gas stream moves without disturbance;
- the elements have, in cross-section, a localized structure which is limited with regard to the exhaust line and the part of the stream flowing across these heat-exchange elements is a minority, so that the heat-exchange elements produce a minority obstruction of the stream of the exhaust gases;
- the heat-exchange elements have, in cross-section, a substantially complete structure, with regard to the exhaust line, with a sufficiently high porosity or permeability so that obstruction of the stream of the exhaust gases remains partial, "complete" meaning that the exchange section extends over the whole cross-section of the exhaust line;
- the exhaust units in which the heat-exchange elements are installed are chosen, in upstream-to-downstream order, among a diffuser with a central cone supported by structural arms, an exhaust nozzle, an extension piece/deflector and an end ejector;
- the structure of the heat-exchange elements is chosen among an annular intermediate structure, a structure of a vane assembly/deflector for channeling the stream with radial plates, a structure of a stream splitter, in particular radial, with advantageously a variable porosity at the inlet of the hot gas stream, notably in order to homogenize the stream; an intermediate or splitting shape has an influence on the diffusion features by making it possible either to increase the diffusion of the stream while keeping exhaust isostability and isolength or to shorten the exhaust while keeping isodiffusion;
- each heat-exchange element includes one or several independent channels for cold fluid, the pressures of which can differ from each other in case of multiple circuits;
- either the heat-exchange elements are positioned in the exhaust line and mould its shape, or heat-exchange elements stand off, i.e. stand in the inside of the line, according to the structure of these elements and that of the exhaust unit in which they are installed;
- in order to preserve the ejector air-intake capacities due to Venturi effect at a connection with the nozzle or extension piece/deflector, the stand-off location is advantageously selected in conjunction with an installation directly upstream from the end ejector, the stand-off arrangement making it possible to leave a sheet of non-disturbed stream around the heat exchanger, and/or in the end ejector;

owing to their structure and arrangement, the heat-exchange elements are capable of constituting insulating surfaces and a sound-absorbing material so that drag and aerodynamic noise are substantially reduced.

BRIEF DESCRIPTION OF THE DRAWINGS

Other aspects, characteristics and advantages of the invention will appear in the following description relative to particular non-restrictive embodiments and referring to the annexed drawings which are, respectively.

DETAILED DESCRIPTION OF EMBODIMENTS

In the description which follows, the terms upstream and downstream—respectively front and rear—relate to the location with regard to the direction of the stream of the gases of a turbine engine with a rectilinear main axis X'X. Besides, in all the Figs., identical or similar elements having an identical function are identified with identical or closely related reference marks.

Figure 1:
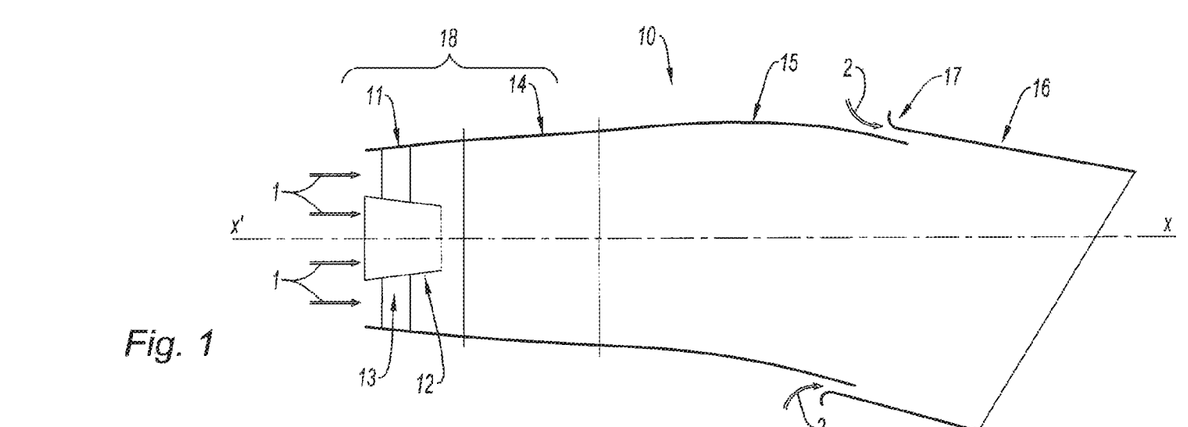
In FIG. 1, a schematic sectional view of the component units of an exhaust assembly of a turbine engine.

In reference to FIG. 1, the schematic sectional view of an exhaust line 10 of a turbine engine consists of units which are successively linked together in the upstream-to-downstream direction with regard to axis X'X, namely: a diffuser 11, comprising a diffusion cone 12 for the stream of the gases 1—mounted along the axis by means of arms 13 that are radial in the illustrative example—, a nozzle 14, an extension piece 15—which generally globally deflects the stream of the gases 1—and a gas ejector 16 with an annular connection 17 which is opened in order to draw the air 2 in. The diffuser 11 and nozzle 14 can form a single diffuser-nozzle unit 18.

Figure 2:
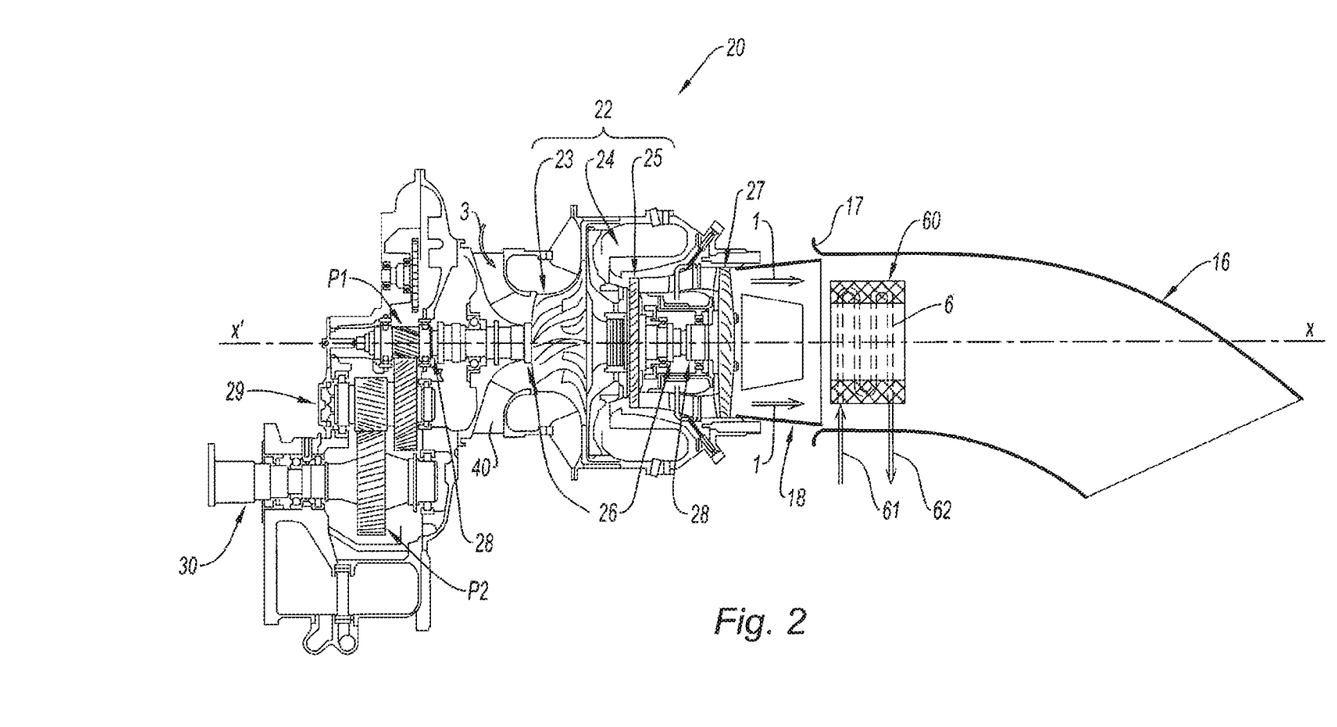
In FIG. 2, a schematic sectional view of an architecture with an annular heat-exchange element inside the ejector of a turbine engine with power take-off at the turbine through-shaft via a reduction gear.
Figure 3:
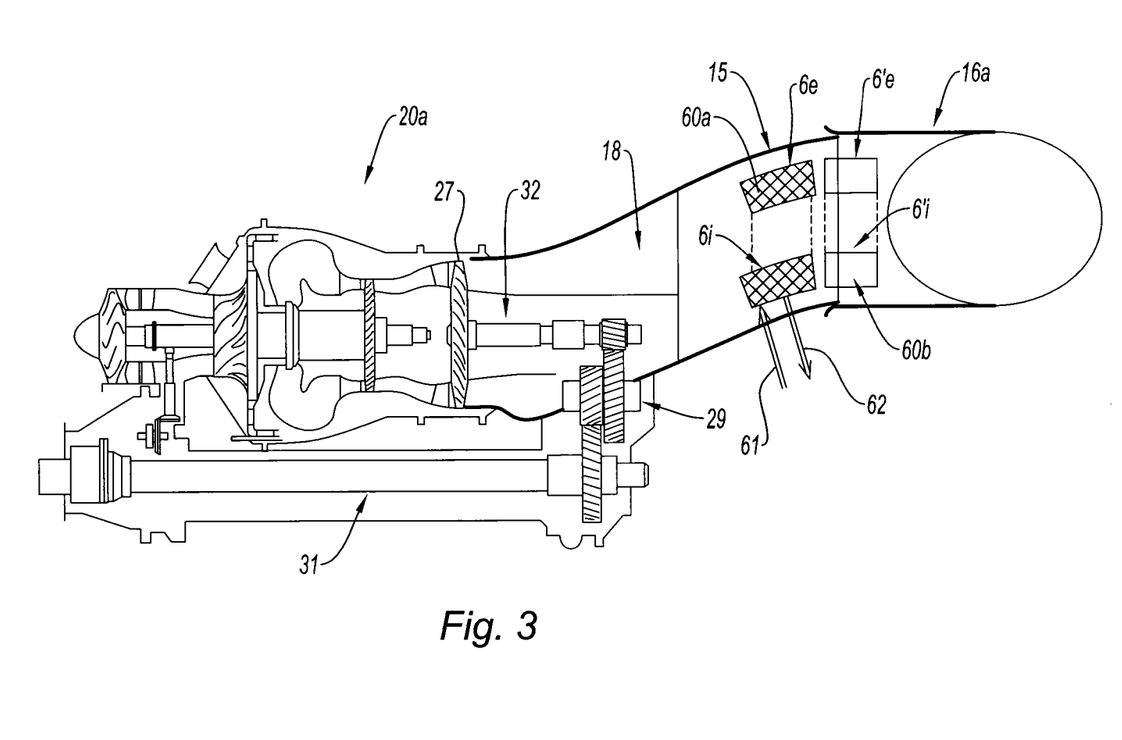
In FIG. 3, a schematic sectional view of an architecture with a heat-exchange element adapted in shape inside the extension piece or partially built into the ejector of a turbine engine with front power take-off at an outside propeller shaft which is in rear meshing with the turbine shaft via a reduction gear.
Figure 4:
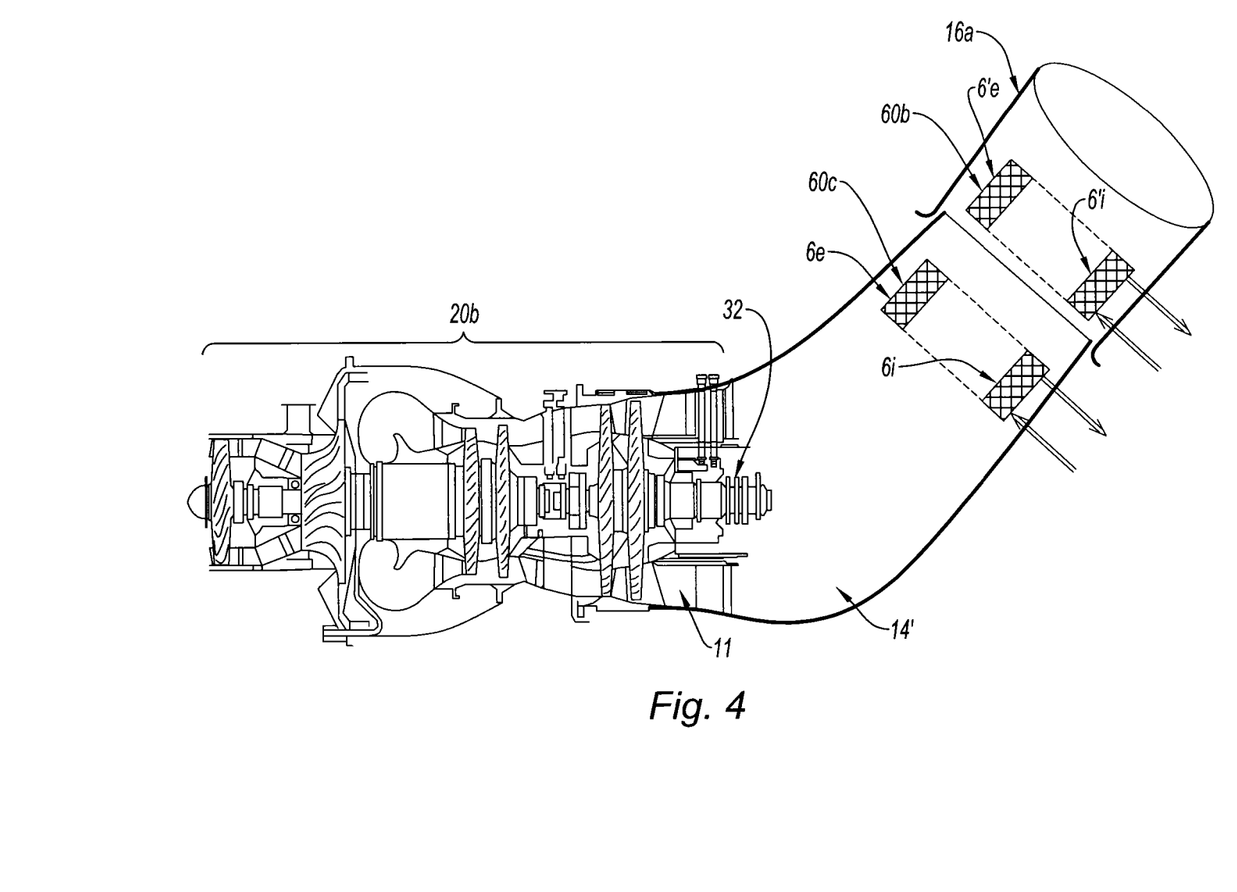
In FIG. 4, a schematic sectional view of an architecture with a heat-exchange element adapted in shape inside the nozzle or ejector of a turbine engine with rear direct power take-off.

The heat-exchange elements of the exhaust architectures according to the invention can be installed in any type of turbine engines, in particular in turbine engines with front power take-off at a through-going drive shaft, with front power take-off at an outside drive shaft in rear meshing, and with direct power take-off at a rear turbine shaft. FIGS. 2 to 4 show optimized arrangements of heat-exchange elements in the exhaust lines of these types of turbine engine.

In reference to FIG. 2, the turbine engine is a turboshaft engine 20 typically consisting of a gas generator 22—composed of the compressor 23, which is centrifugal in this example, the gas combustion chamber 24 and the high-pressure turbine 25 for driving the compressor 23 via the high-pressure shaft 26—and a free turbine 27. The gas generator 22 has a rotational symmetry around axis X'X. The free turbine 27 drives, via the through-going drive shaft 28 and the reduction gear 29, the power shaft 30 available for the loads (propeller rotor, accessories. The through-going 28 and power 30 shafts are meshed with the reduction gear 29 via gears P1 and P2.

The air 3 which enters through the air-intake ducts 40 is compressed by the compressor 23, injected in the combustion chamber 24 so that it is mixed with fuel and causes combustion. This combustion supplies a high kinetic energy to the gases 1 at the outlet of the chamber and rotatably drives the free turbine 27. The residual gases exhaust through the diffuser/nozzle 18, then through the end ejector 16 coupled with the diffuser/nozzle 18 via the opened connection 17.

A heat exchanger in the form of an annular plate 60 is installed, by ways of any possible well-known means (spacers, arms, etc.), in the axisymmetric upstream inlet part of the ejector 16. These installation means are also used in all the exemplary architectures below. The heat exchanger consists of an inlet channel 61 and an outlet channel 62, connected to the inlet and outlet of a central channel 6 which is wound into the shape of a helix or sine curves in the annular plate 60. The channels 61 and 62 are connected at the other ends thereof to electromechanical or mechanical means for recovering and recycling the energy in order to improve the overall efficiency of the turbine engine. The energy is recovered via a cold fluid which circulates in the heat-exchange element and is heated in the central channel by thermal transfer of the heat from the hot residual gases 1 at the time of their ejection.

Such a transfer is achieved due to the permeability or porosity of the plate 60 obtained by forming holes 63 (schematically shown in FIGS. 7b, 7d, 8 and 9). These holes have a constant or variable diameter and a density adapted to the location and structure of the heat-exchange elements.

In reference to the schematic sectional view of FIG. 3, the architecture of the turboshaft engine 20a has a front power take-off at an outside power shaft 31 which is in rear meshing with the shaft 32 of the turbine 27 via the reduction gear 29. The exhaust line of this turboshaft engine 20a consists of a diffuser/nozzle 18, an extension piece 15 and an axisymmetric ejector 16a. The heat-exchange element consists of a plate 60a, installed in a non-axisymmetric portion of the extension piece 15 and connected to the inlet and outlet channels 61 and 62. The plate 60a is quasi-annular and has parallel external 6e and internal 6i faces the form of which is adapted and advantageously parallel to the opposite face of the extension piece 15. Alternatively, a plate 60b of the heat-exchange element can be installed partially in the extension piece and partially in the ejector, preferably mostly in the axisymmetric ejector 16a. In that case, the plate 60b is annular and has faces 6'e and 6'i which have a circular section.

In a turboshaft engine 20b with direct power take-off at the rear shaft 32, i.e. without reduction gear, as shown in the schematic sectional view of FIG. 4, the exhaust architecture comprises a diffuser 11, a non-axisymmetric curved nozzle 14' and an axisymmetric ejector 16a. The heat-exchange element consists of a plate of quasi-annular shape 60c installed in the downstream part of the nozzle 14', with faces 6e and 6i parallel to the shape of the nozzle 14'. Alternatively, a plate 60b of annular shape can be installed in the ejector 16a, faces 6'e and 6'i having a circular section.

In all the above arrangements (FIGS. 2 to 4), the annular or quasi-annular plate of the heat-exchange element 60 or 60a to 60c is positioned in zones which are close to the faces of the exhaust units. In these conditions, this plate is well fed with hot gases stemming from the gas generator and flowing across the plate in the form of layers while leaving a central and major part of non-disturbed gas stream.

Figure 5:
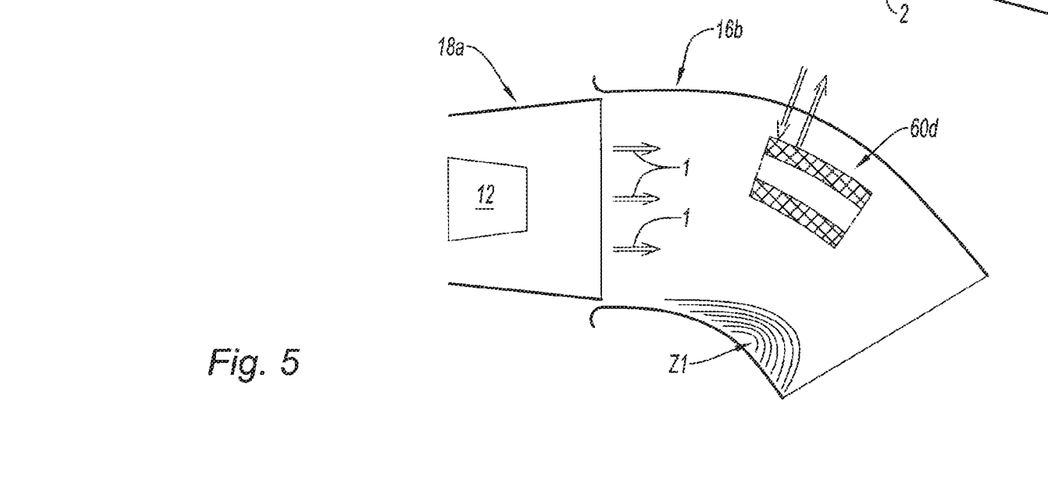
In FIG. 5, a schematic sectional view of an exhaust with optimized location of a heat-exchange element inside a curved ejector.

In case an exhaust unit presents a separated or low-Mach (low gas speed) zone, the heat-exchange element can advantageously have a non-annular shape. So, the schematic sectional view of FIG. 5 relates to an exhaust line with a curved ejector 16b. This ejector is coupled with the axisymmetric diffuser/nozzle 18a and has a separated zone Z1 of large curvature which is by-passed by the gas stream 1 because of the axial flowing of the latter in the diffuser/nozzle 18a. The heat-exchange element consists of a tubular plate 60d installed in the lower-curvature curve of the ejector 16b, on the opposite side from the separated zone Z1, so as to receive a good supply of gas stream 1.

The heat exchanger can advantageously have structures making it possible to control and optimize the diffusion of the gas stream by improving the aerodynamic characteristics of this diffusion.

Figure 6A:
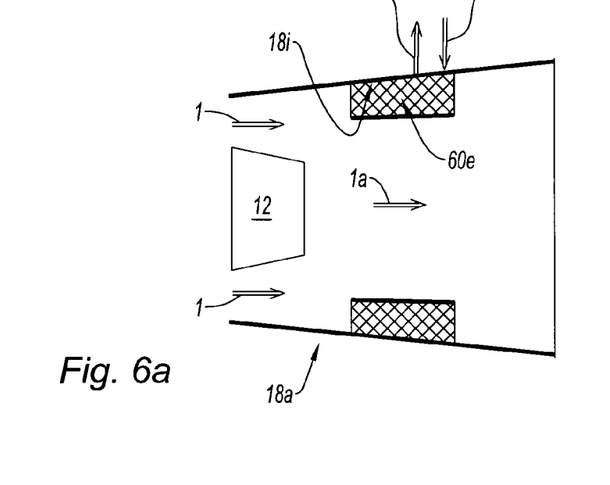
In FIGS. 6a to 6c, three schematic sectional views of an architecture including a heat-exchange element inside a diffuser/nozzle, with a location of this heat-exchange element and a structure of the exhaust unit appropriate for increasing the diffusion.
Figure 6B:
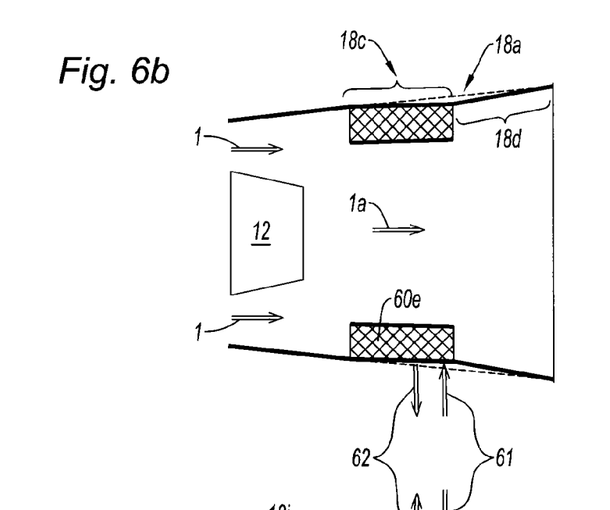
Figure 6C:
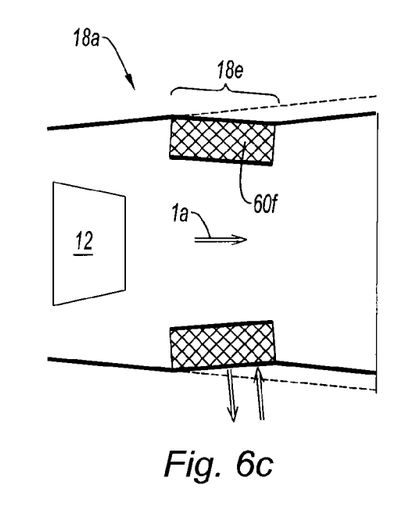

FIGS. 6a to 6c show three schematic sectional views of an architecture including an annular heat-exchange element in a diffuser/nozzle making it possible to lower the static pressure at the outlet of the heat exchanger. In reference to FIG. 6a, the heat-exchange element consists of the annular plate 60e, installed in the axisymmetric conical diffuser/nozzle 18a opening downstreamwardly, and the input-output channels 61 and 62. The plate 60e is localized against the inner face 18i of the diffuser/nozzle. Alternatively (FIG. 6b), the diffuser/nozzle 18a has a quasi-cylindrical portion 18c, i.e. slightly opened downstreamwardly, in which the annular plate 60e is installed. The diffuser/nozzle 18a (the pre-modification portions appear as dotted lines) has then a more opened portion 18d so as to catch up with the non-modified outline of the diffuser/nozzle 18a.

In these first two variants, the static component of the pressure is reduced at the outlet of the heat exchanger 60e by means of a lesser diffusion of the non-obstructed stream 1a. The diffusion of the gas stream 1 through the plate 60e is thus favored. In the case shown in FIG. 6c, the portion of the annular plate of exchange 60f in which the diffuser/nozzle 18e is installed has a conical shape with downstream convergence. The non-obstructed gas stream 1a is thus accelerated due to the fact that the portion 18e of the diffuser/nozzle 18a narrows. This acceleration of the non-obstructed stream 1a fuels the feed-stream for the heat-exchange plate 60f.

So as to improve the diffusion features, the heat-exchange element can consist of conical annular plates associated with a nozzle which has the same shape. FIGS. 7a to 7d show views, in schematic section (FIGS. 7a and 7c) and in transparent perspective (FIGS. 7b and 7d), of architectures including a heat-exchange element of the so-called "intercalary"-type with two concentric annular plates 60g and 60h in the diffuser/nozzle 18. The nozzle part 14a has a conicity with a larger angle, for example 25°, with regard to the diffuser part 11-12, for example 13°, which corresponds to the conicity of the non-modified nozzle 14 (in dotted lines). The concentric annular plates 60g and 60h have a conicity the angle of which is slightly smaller, for instance 21 and 15° respectively.

Figure 7A:
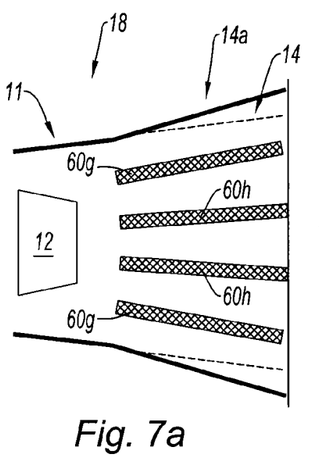
In FIGS. 7a to 7d, two schematic sectional views and two respective transparent perspective views of architectures including an annular heat-exchange element with double plate inside a diffuser/nozzle, with either an increase of the angle of diffusion (FIGS. 7a and 7c) or a nozzle shortening (FIGS. 7b and 7d)
Figure 7B:
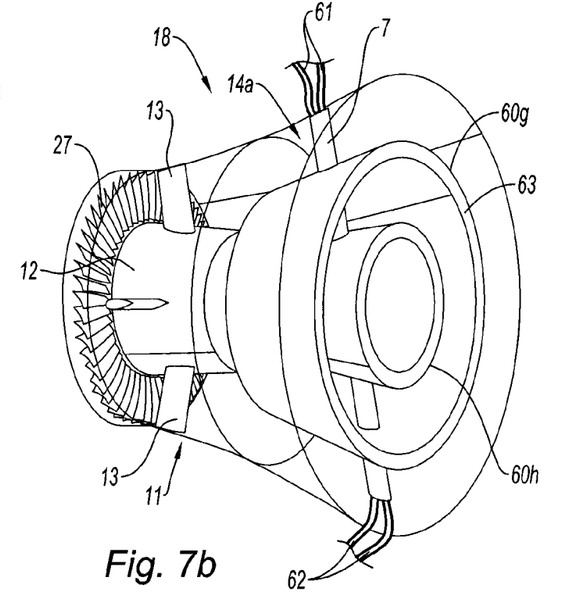

Globally, the nozzle 14a has the same length as the non-modified nozzle (FIG. 7a). This operation substantially increases the diffusion, which leads to a higher coefficient of static recovery and thus to a higher efficiency of the turboshaft engine. Alternatively (FIG. 7c), the nozzle 14b is shortened with regard to the non-modified nozzle 14, so that the diffusion meets its initial level. In these conditions, at equal diffusion, the shortening of the nozzle makes it possible to save weight and reduce bulk.

Figure 7C:
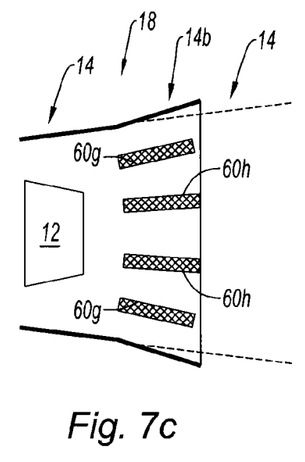
Figure 7D:
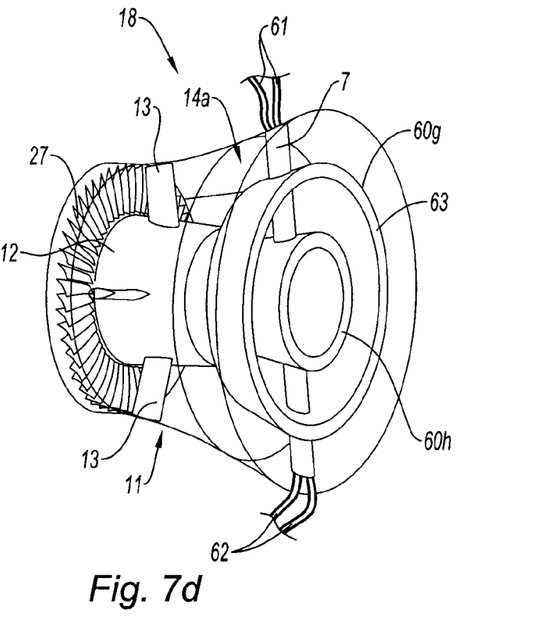

FIGS. 7c and 7d show transparent perspective views of this architecture including the annular heat-exchange element with two concentric annular plates 60g and 60h, for increased diffusion and with shortened nozzle 14b respectively. These plates are installed in the nozzles 14a and 14b by means of a cylindrical radial arm 7. This arm can contain the inlet 61 and outlet 62 channels of the plates 60g and 60h. The diffuser part 11, which contains the diffusion cone 12—maintained by the radial arms 13—, as well as the free turbine 27, through which the residual hot gases expand, and the air-flow holes 63, which are visible on the downstream section of the plates, are to be seen in FIGS. 7b and 7d (as well as in the following FIGS. 8 and 9).

Figure 8:
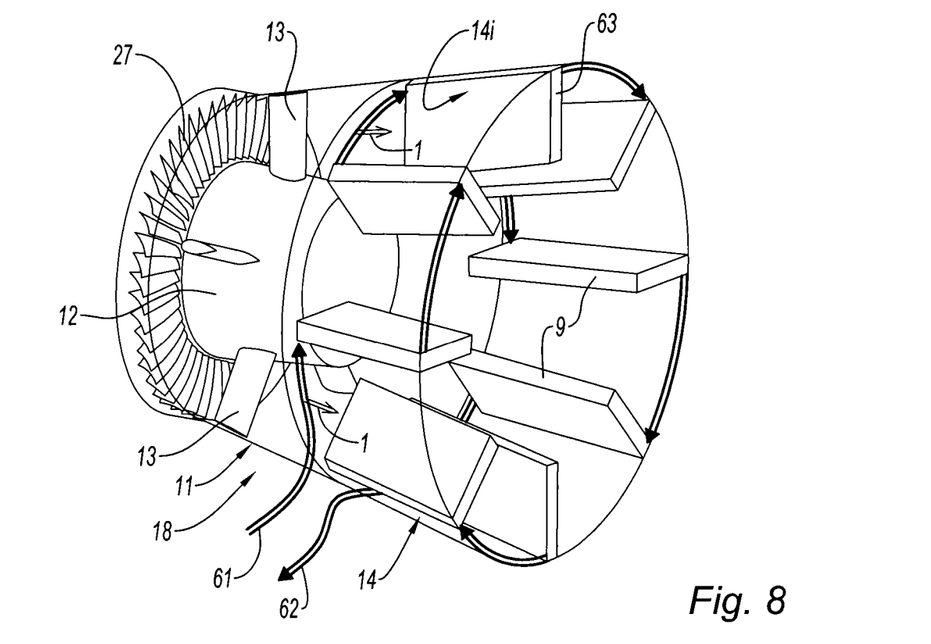
In FIG. 8, a transparent perspective view of an architecture including a heat-exchange element with radial plates inside the diffuser/nozzle of a turbine engine, and In FIG. 9, a transparent perspective view of an architecture of a curved nozzle including a heat-exchange element as a complete radial plate, the curvature of which follows the primary line of the nozzle.

The heat-exchange element can also consist of a vast number of radial plates in order to form a heat exchanger of the type of a vane assembly for guiding a stream. So, FIG. 8 shows a perspective transparent view of an exhaust architecture including, in the nozzle part 14 of the diffuser/nozzle 18, eight radial plane plates 9 installed at the inner face 14i of the nozzle by any possible well-known means of fixation (welding, screwing, riveting, fastening with tabs, arms, spacers, . . . ). The radial plates 9 make it possible to increase the coefficient of pressure recovery of the nozzle 14 by guiding the gas stream 1 at the turbine outlet.

The inlet 61 and outlet 62 channels are connected in series from one plate to the other and linked to the energy recovery means. Alternatively, the plates can be fed in parallel through individual input-output channels and common feed and return modules. Other units which were already discussed above appear in this FIG.: diffuser part 11 with diffusion cone 12, radial arms 13, free turbine 27.

Figure 9:
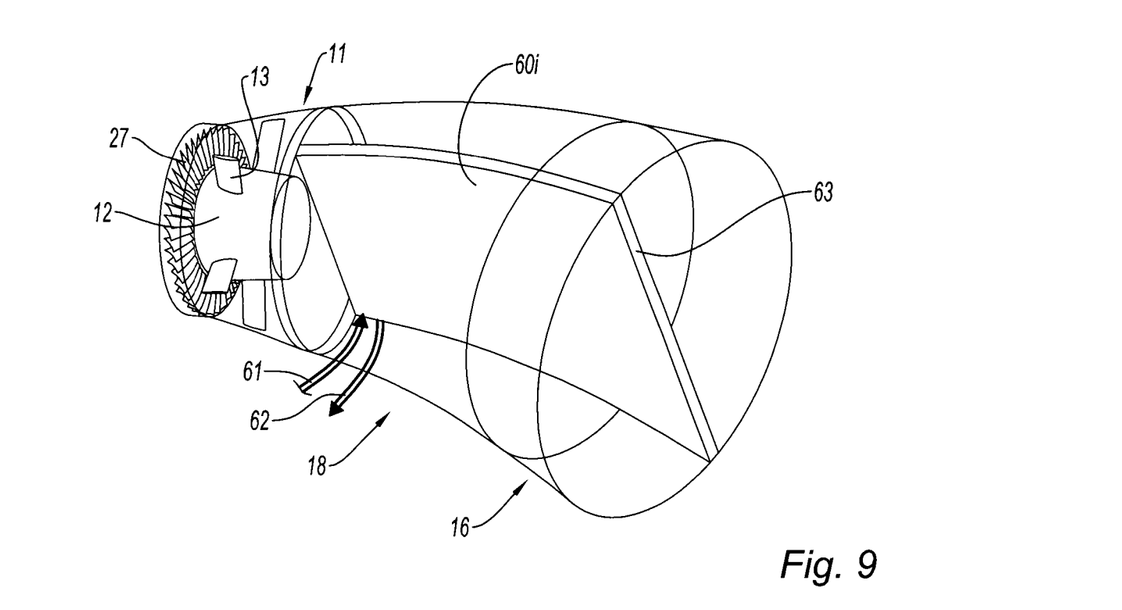

A heat-exchange element with the structure of a stream splitter is shown in the transparent perspective view of the exhaust architecture with curved nozzle of FIG. 9. The structure has the form of a complete radial plate 60i the curvature of which follows the average curvature of the nozzle 18 and ejector 16. Already set out units (input-output 61 and 62 channels, diffuser 11 and diffusion cone 12, radial arms 13, free turbine 27) also appear in this FIG. Whether the nozzle is straight or curved (as in FIG. 9), such a splitting-plate structure has an influence on the diffusion features: like intercalary plates, it makes it possible either to increase the diffusion of the stream with isostability and isolength of exhaust, or to shorten the exhaust with isodiffusion. It also makes it possible to increase the coefficient of pressure recovery of the nozzle 18 by guiding the gas stream 1 at the turbine outlet.

In the cases of curved nozzles ensuring a jet deflection function (see FIG. 9), such a splitting-plate structure also takes part in the deflection by ensuring a better guiding of the jet.

The present invention is not limited to the described and shown examples. For instance, it is possible to provide plates for heat exchange with a crosswise or star-shaped structure in order to form splitters. Besides, the exhaust line can be limited to a nozzle or consist of all or part of the set-up additional exhaust units:

diffuser, extension piece, deflector and/or ejector. Furthermore, each heat-exchange element can include one or several independent cold-fluid-circulation channels, the pressures of which can differ from each other in case of multiple circuits.

The invention claimed is:

1. An architecture of a turbine engine including an exhaust line for a stream of hot gases of the turbine engine, wherein the exhaust line is divided into a first segment including a heat exchanger built into the exhaust line and a second segment including a flow channel, the architecture with the built-in heat exchanger comprising:

the heat exchanger that includes heat-exchange elements installed in one of units constituting the exhaust line configured to channel the stream of the hot gases and achieve a partial obstruction of the stream of the hot gases, in an environment that globally diffuses the hot gases, while a part of the stream of the hot gases flows across the heat-exchange elements, and the heat-exchange elements are positioned downstream in a flow direction of the hot gases from a downstream end of a central cone of a diffuser, and the central cone of the diffuser is disposed inside the exhaust line; and a mechanical or electromechanical mechanism connected to the heat-exchange elements to recover and recycle residual thermal energy of the hot gases to increase power available at a shaft of the turbine engine without substantially disturbing the stream of the hot gases, wherein a majority part of a totality of the stream of the hot gases passes the heat exchange elements in the flow channel as a non-obstructed gas stream that is not obstructed by the heat exchange elements.

2. The architecture with the built-in heat exchanger according to claim 1, in which the heat-exchange elements include a structure with a section that evolves in a continuous way.

3. The architecture with the built-in heat exchanger according to claim 1, in which the heat-exchange elements include, in cross-section, a localized structure, which is limited with regard to the exhaust line in which they are installed, and the part of the stream of the hot gases flowing across the heat-exchange elements is a minority of the totality of the stream of the hot gases, so that the heat-exchange elements produce a minority obstruction of the stream of the hot gases.

4. The architecture with the built-in heat exchanger according to claim 1, in which the heat-exchange element includes, in cross-section, a substantially complete structure, with regard to the exhaust line, with a sufficiently high porosity or permeability so that obstruction of the stream of the hot gases remains partial.

5. The architecture with the built-in heat exchanger according to claim 1, in which the units constituting the exhaust line, in which the heat-exchange elements are installed, are chosen, in upstream-to-downstream order, among the diffuser with the central cone supported by structural arms, an exhaust nozzle, an extension piece/deflector, and an end ejector.

6. The architecture with the built-in heat exchanger according to claim 1, in which a structure of the heat-exchange elements is chosen among an annular intermediate structure, a structure of a vane assembly/deflector to channel the stream of the hot gases with radial plates, a structure of a stream splitter, with a variable porosity at an inlet of the stream of the hot gases.

7. The architecture with the built-in heat exchanger according to claim 6, in which the stream splitter is a radial stream splitter.

8. The architecture with the built-in heat exchanger according to claim 6, in which an intermediate or splitting shape makes it possible either to increase diffusion of the stream of the hot gases while keeping exhaust isostability and isolength or to shorten the exhaust line while keeping isodiffusion.

9. The architecture with the built-in heat exchanger according to claim 1, in which each of the heat-exchange elements includes one or plural independent channels for cold fluid.

10. The architecture with the built-in heat exchanger according to claim 1, in which either the heat-exchange elements are positioned into the exhaust line and mold to a shape of a unit in which they are installed, or the heat-exchange elements stand off.

11. The architecture with the built-in heat exchanger according to claim 1, in which at least a portion of the heat-exchange elements is disposed radially outward of the central cone of the diffuser.

12. The architecture with the built-in heat exchanger according to claim 1, in which the heat exchange elements include an inlet channel for a cold fluid and an outlet channel for the cold fluid, and the outlet channel is positioned downstream from the inlet channel in the flow direction of the hot gases.

13. The architecture with the built-in heat exchanger according to claim 12, in which the heat exchange elements include a central channel for the cold fluid, the central channel is wound into a shape of a helix or sine curve, and the central channel connects the inlet channel and the outlet channel.

* * * * *